(12) United States Patent
Morita et al.

(10) Patent No.: US 11,442,523 B2
(45) Date of Patent: Sep. 13, 2022

(54) CABLE AND CONNECTION DEVICE

(71) Applicant: SONY CORPORATION, Tokyo (JP)

(72) Inventors: Hiroshi Morita, Kanagawa (JP); Kazuaki Toba, Kanagawa (JP); Kazuo Yamamoto, Chiba (JP); Masanari Yamamoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 257 days.

(21) Appl. No.: 16/640,938

(22) PCT Filed: Aug. 27, 2018

(86) PCT No.: PCT/JP2018/031613
§ 371 (c)(1),
(2) Date: Feb. 21, 2020

(87) PCT Pub. No.: WO2019/044782
PCT Pub. Date: Mar. 7, 2019

(65) Prior Publication Data
US 2020/0209942 A1 Jul. 2, 2020

(30) Foreign Application Priority Data
Sep. 1, 2017 (JP) .............................. JP2017-169024

(51) Int. Cl.
*G06F 1/00* (2006.01)
*G06F 1/3215* (2019.01)
(Continued)

(52) U.S. Cl.
CPC ..... *G06F 1/3215* (2013.01); *H04N 21/43635* (2013.01); *G06F 1/3203* (2013.01); *G09G 2330/021* (2013.01)

(58) Field of Classification Search
None
See application file for complete search history.

(56) References Cited

U.S. PATENT DOCUMENTS 5,619,729 A * 4/1997 Bland .................. G06F 1/3225
710/262
9,253,535 B2 * 2/2016 Kabuto ................ G06F 1/3265
(Continued)

FOREIGN PATENT DOCUMENTS

| CN | 101188723 A | 5/2008 |
| CN | 203313498 U | 11/2013 |

(Continued)

OTHER PUBLICATIONS

International Search Report and Written Opinion of PCT Application No. PCT/JP2018/031613, dated Nov. 6, 2018, 07 pages of ISRWO.

(Continued)

*Primary Examiner* — Volvick Derose
(74) *Attorney, Agent, or Firm* — Chip Law Group

(57) ABSTRACT

It is made possible to consume current without adversely affecting the others. A cable is connected between a first device and a second device. A power line that supplies a current from the first device to the second device, and a current consumption unit that receives supply of a current from the first device through the power line, are included. A detection unit that detects that the second device is in the operating state, and a control unit that cancels a stop state of current consumption of the current consumption unit in response to the detection information, are further included.

7 Claims, 14 Drawing Sheets

(51) Int. Cl.
*H04N 21/4363* (2011.01)
*G06F 1/3203* (2019.01)

(56) References Cited

U.S. PATENT DOCUMENTS

| | | | | |
|---|---|---|---|---|
| 10,897,243 | B2* | 1/2021 | Morita | H04N 21/436 |
| 2006/0034376 | A1* | 2/2006 | Rakshani | H04L 12/10 |
| | | | | 375/257 |
| 2008/0304194 | A1* | 12/2008 | Udagawa | G06F 1/266 |
| | | | | 361/87 |
| 2009/0199022 | A1* | 8/2009 | Fukuda | H04N 1/00885 |
| | | | | 713/300 |
| 2010/0100200 | A1* | 4/2010 | Kim | G06F 13/4022 |
| | | | | 700/12 |
| 2011/0080046 | A1* | 4/2011 | Lee | G06F 1/266 |
| | | | | 307/39 |
| 2011/0266870 | A1* | 11/2011 | Hu | H01R 13/6683 |
| | | | | 307/39 |
| 2012/0153908 | A1* | 6/2012 | Wu | H02J 7/0031 |
| | | | | 361/18 |
| 2014/0327833 | A1* | 11/2014 | Kabuto | H04N 21/4432 |
| | | | | 348/730 |
| 2016/0085280 | A1* | 3/2016 | Harel | G06F 1/3287 |
| | | | | 710/14 |
| 2017/0111609 | A1* | 4/2017 | Yang | H04N 5/765 |
| 2018/0048848 | A1* | 2/2018 | Park | H04N 21/44231 |
| 2020/0209942 | A1* | 7/2020 | Morita | H04N 21/4436 |
| 2021/0082601 | A1* | 3/2021 | Morita | H04N 21/61 |
| 2021/0135708 | A1* | 5/2021 | Yamamoto | G06F 3/00 |

FOREIGN PATENT DOCUMENTS

| | | |
|---|---|---|
| CN | 104054037 A | 9/2014 |
| JP | 2015-111418 A | 6/2015 |
| WO | 2013/088480 A1 | 6/2013 |

OTHER PUBLICATIONS

Office Action for CN Patent Application No. 201880055950.0, dated Sep. 27, 2021, 07 pages of English Translation and 06 pages of Office Action.

* cited by examiner

CABLE AND CONNECTION DEVICE

CROSS REFERENCE TO RELATED APPLICATIONS

This application is a U.S. National Phase of International Patent Application No. PCT/JP2018/031613 filed on Aug. 27, 2018, which claims priority benefit of Japanese Patent Application No. JP 2017-169024 filed in the Japan Patent Office on Sep. 1, 2017. Each of the above-referenced applications is hereby incorporated herein by reference in its entirety.

TECHNICAL FIELD

The present technology relates to a cable and a connection device, and more particularly, to a cable and a connection device including a current consumption unit such as an element that adjusts signal quality.

BACKGROUND ART

In recent years, High Definition Multimedia Interface (HDMI) or the like has been used as a digital interface for connecting consumer electronics (CE) devices to each other. For example, Patent Document 1 describes the HDMI standard. In the HDMI standard, digital signals such as video, audio, and control are transmitted using a Transition Minimized Differential Signaling (TMDS) channel. Note that, "HDMI" is a registered trademark.

CITATION LIST

Patent Document

Patent Document 1: Japanese Patent Application Laid-Open No. 2015-111418

SUMMARY OF THE INVENTION

Problems to be Solved by the Invention

For example, in a case where HDMI is used as a digital interface, a source device such as a Blu-ray Disc (BD) player and a sink device such as a television (TV) receiver are connected to each other by an HDMI cable. In the HDMI cable, assigned lines are: four high-speed signal lines including a clock line; a +5 V power line; a Display Data Channel (DDC) line; a Consumer Electronics Control (CEC) line; a Hot Plug Detect (HPD) line; a Utility line; and the like. In the high-speed signal line, digital signals such as video, audio, and control are transmitted as TMDS data. In this case, a current drive type is used that transmits data "0" and "1" by drawing a current by the source side from a termination resistor of 50Ω connected to 3.3 V on the sink side. Note that, "Blu-ray" is a registered trademark.

In the HDMI standard, a sequence at connection of the HDMI cable is defined, and when both plugs of the cable are respectively connected to the source device and the sink device, a voltage of 5 V is transmitted from the source device to the sink device via the +5 V power line, and when 5 V is detected in the sink device, 5 V is transmitted from the sink device to the source device via the HPD line, whereby the source device is informed that the cable is correctly connected.

When detecting 5 V of the HPD line, the source device determines that the cable is connected, and reads Extended Display Identification Data (EDID) on the sink device side by using the DDC line. There is a possibility that an EDID ROM in the sink device consumes a maximum of about 50 mA, and HDMI enables the sink device to draw the 50 mA from the source device via the cable. On the other hand, the compensation value of the current output from the +5 V power line in the source device is 55 mA minimum, and thus the minimum value of the current that can be used by the cable is 5 mA.

In the case of the normal HDMI cable, there is almost no power consumption in the cable, so 5 mA is sufficient. On the other hand, in the case of an active optical cable (AOC) that performs communication using light instead of a copper wire, a circuit for converting electricity into light and a circuit for converting light into electricity are required at both plugs of the cable, and operation is usually difficult at 5 mA.

However, in practice, after reading the EDID, the sink device does not need to draw as much as 50 mA from the +5 V power line, and about 10 mA is sufficient. At this time, in the cable, power can be used related to an unused portion in the sink device for the minimum 55 mA of the amount of current supply of the source device. A typical AOC consumes power of greater than or equal to 5 mA, assuming the above. Note that, an active copper cable (ACC) incorporating a circuit for driving electrical 50Ω wiring inside the cable also requires a drive current for the internal circuit similarly.

As described above, there are many active cables that consume greater than or equal to 5 mA. Then, the active cable draws a current due to circumstances of the cable regardless of a state of the sink device. At this time, if the cable uses a current greater than or equal to 50 mA although the source device uses 50 mA in the sink device to read the EDID, 50 mA is not fully supplied to the sink device side, and an EDID function may be adversely affected.

An object of the present technology is to make it possible to consume a current without adversely affecting the others.

Solutions to Problems

The concept of the present technology is in
a cable connected between a first device and a second device,
the cable including:
a power line that supplies a current from the first device to the second device;
a current consumption unit that receives supply of a current from the first device through the power line;
a detection unit that detects that the second device is in an operating state; and
a control unit that cancels a stop state of current consumption of the current consumption unit in response to the detection information.

The cable in the present technology is connected between the first device and the second device, and includes the power line that supplies the current from the first device to the second device, and the current consumption unit that receives the supply of the current from the first device through the power line. For example, the current consumption unit may be an element that adjusts signal quality interposed in a data line. Furthermore, for example, the first device may be an HDMI transmitter, and the second device may be an HDMI receiver.

The detection unit detects that the second device is in the operating state. For example, the detection unit may determine that the second device is in the operating state when a predetermined voltage is applied to the data line on the second device's side. The control unit cancels the stop state of the current consumption of the current consumption unit in response to the detection information.

For example, the detection information from the detection unit may be sent to the control unit through a predetermined line. Furthermore, for example, the control unit may control the current consumption unit to the operating state in response to the detection information. Furthermore, for example, the control unit may control a power source unit in the cable to the operating state in response to the detection information, the power source unit supplying a current to the current consumption unit.

As described above, in the present technology, it is detected that the second device is in the operating state, and the stop state of the current consumption of the current consumption unit is canceled in response to the detection information. Therefore, it is possible to satisfactorily consume the current in the current consumption unit without adversely affecting current consumption operation before the operating state of the second device.

Effects of the Invention

According to the present technology, it is possible to consume a current without adversely affecting the others. Note that, the advantageous effects described in this specification are merely examples, and the advantageous effects of the present technology are not limited to them and may include additional effects.

MODE FOR CARRYING OUT THE INVENTION

The following is a description of a mode for carrying out the invention (the mode will be hereinafter referred to as the "embodiment"). Note that, explanation will be made in the following order.

1. Embodiment
2. Modifications

1. Embodiment

[Configuration of Transmission System]

Figure 1:
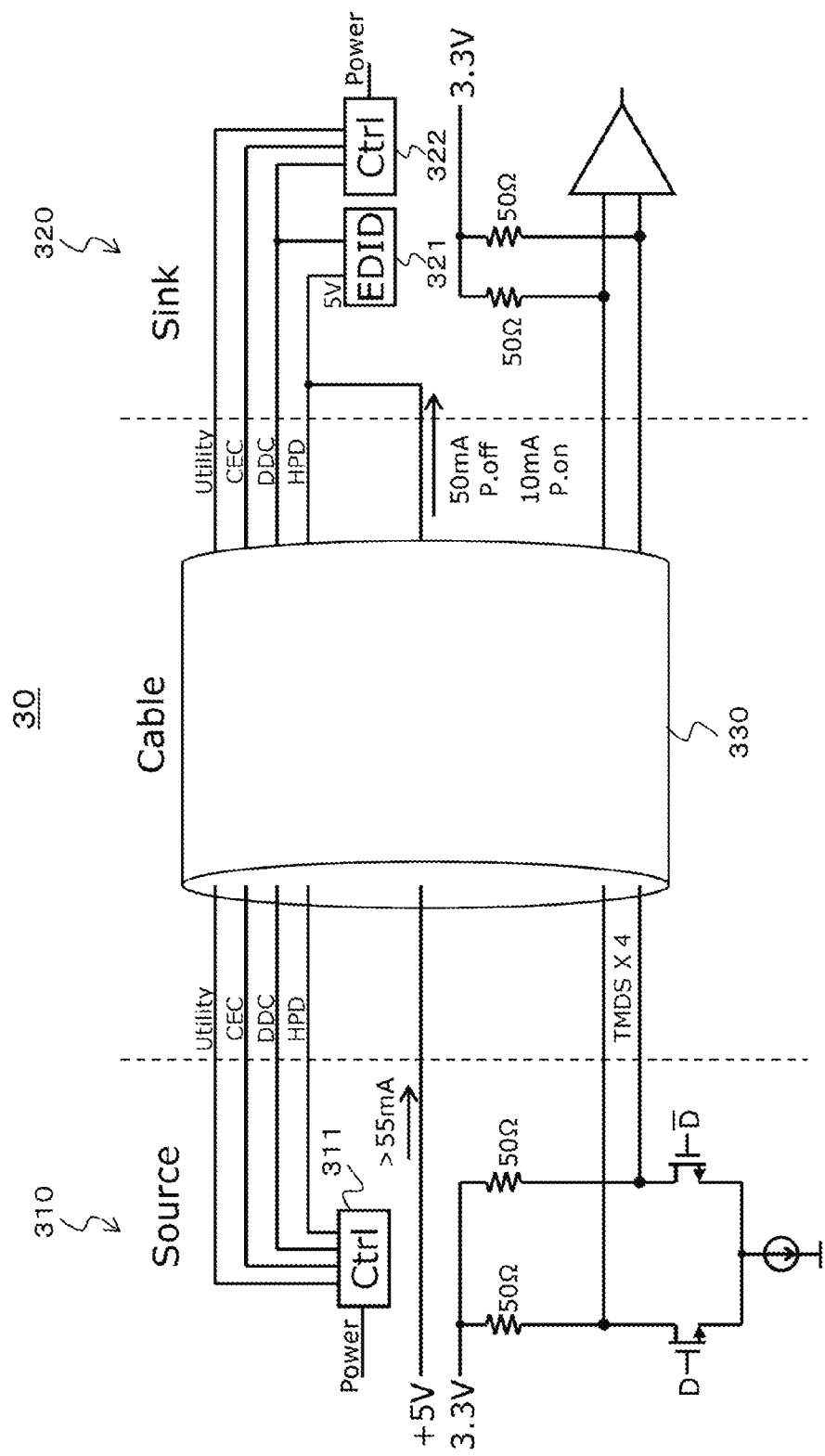
FIG. 1 is a diagram illustrating a configuration example of a transmission system using HDMI as a digital interface.

FIG. 1 illustrates a configuration example of a transmission system 30. The transmission system 30 is an HDMI transmission system using HDMI as a digital interface. The transmission system 30 includes a source device 310 that is an HDM transmitter, a sink device 320 that is an HDMI receiver, and an HDMI cable 330 that connects them to each other.

Transmission channels of the transmission system 30 include three TMDS channels that transmit, as digital data, signals of video, audio, and control as TMDS data, and one TMDS clock channel that transmits a clock signal. Each of the TMDS channels and the TMDS clock channel includes two differential signal lines. In the illustrated example, only one channel is illustrated.

Furthermore, there are a DDC line, a CEC line, an HPD line, a Utility line, and a +5 V power line as control signal lanes for an HDMI system. The DDC line includes two signal lines, an SDA line and an SCL line included in the HDMI cable 330. The DDC line is used, for example, for the source device 310 to read the EDID from the sink device 320. The CEC line is used to perform bidirectional communication of control data between the source device 310 and the sink device 320.

In the TMDS channel, a current drive type is used that transmits data "0" and "1" by drawing a current from a termination resistor of 50Ω connected to the sink device 320 side to the source device 310 side. At this time, a signal is transmitted differentially on the basis of differential signals of D and D (bar). Note that, in the illustrated example, a termination resistor of 50Ω on the source device 310 side is used; however, in TMDS, without using this 50Ω, driving is also possible by only the termination resistor of 50Ω on the sink device side.

In the HDMI standard, a sequence at connection of the HDMI cable 330 is defined, and when both plugs of the HDMI cable 330 are respectively connected to the source device 310 and the sink device 320, a voltage of 5 V is transmitted from the source device 310 to the sink device 320 via the +5 V power line, and when 5 V is detected in the sink device 320, 5 V is transmitted from the sink device 320 to the source device 310 via the HPD line, whereby the source device 310 is informed that the cable is correctly connected.

When detecting 5 V of the HPD line, the control unit 311 of the source device 310 determines that the cable is connected, and reads the EDID in the EDID ROM 321 on the sink device 320 side by using the DDC line. Thereafter, using a control line such as the DDC line, exchange of signals such as a High-bandwidth Digital Content Protection System (HDCP) is started between the source device 310 and the sink device 320, and transmission of TMDS data by using the TMDS channel is started in one direction from the source device 310 to the sink device 320. Note that, the source device 310 and the sink device 320 can exchange information by using a register prepared in a control unit 322 on the sink device 320 side.

As described above, when the control unit 311 of the source device 310 reads the EDID in the EDID ROM 321 on the sink device 320 side by using the DDC line, there is a possibility that the EDID ROM 321 consumes a maximum of 50 mA, and HDMI enables the sink device to draw the 50 mA from the source device via the cable. On the other hand, the compensation value of the current output from the +5 V power line in the source device 310 is 55 mA minimum, and thus the minimum value of the current that can be used by the cable is 5 mA.

With the normal HDMI cable 330 as illustrated in FIG. 1, there is almost no power consumption in the cable, so 5 mA is sufficient. On the other hand, in a case where an active optical cable (AOC) is used as the HDMI cable, a circuit for converting electricity into light and a circuit for converting light into electricity are required at both plugs of the cable, and operation is usually difficult at 5 mA. This is similar even in a case where the active copper cable (ACC) is used as the HDMI cable.

Figure 2:
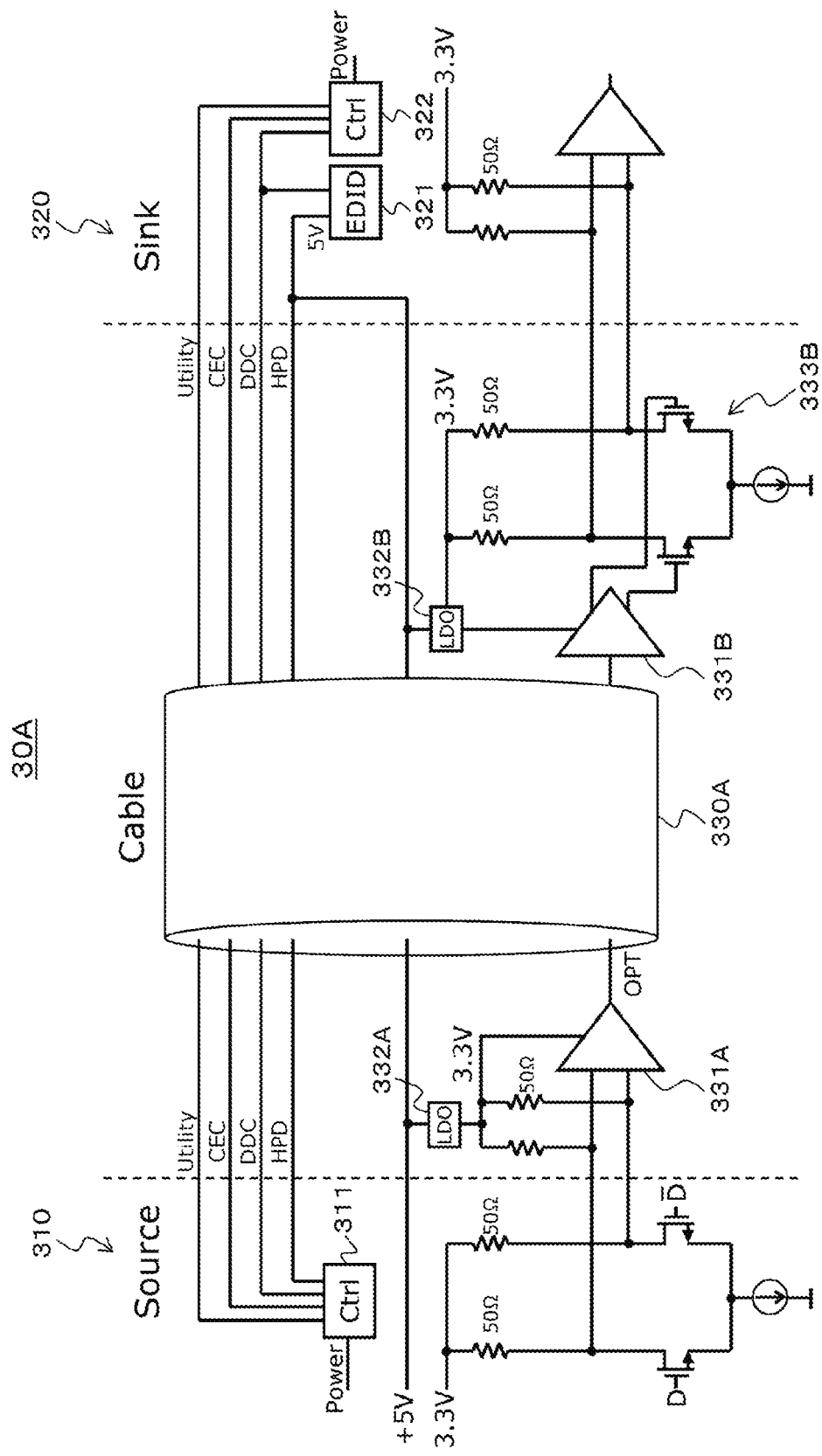
FIG. 2 is a diagram illustrating a configuration example of a transmission system in a case where an HDMI cable that is an AOC is used.

FIG. 2 illustrates a configuration example of a transmission system 30A in a case where an HDMI cable 330A that is an AOC is used. In FIG. 2, portions corresponding to those in FIG. 1 are denoted by the same reference numerals, and detailed description thereof is omitted.

In the case of the transmission system 30A, a conversion circuit 331A for converting electricity into light exists in a source side plug of the HDMI cable 330A, and furthermore, a conversion circuit 331B for converting light into electricity exists in a sink side plug of the HDMI cable 330A. These conversion circuits 331A and 331B are supplied with 3.3 V power sources obtained by low drop out (LDO) regulators 332A and 332B from +5 V of the +5 V power line. Note that, these conversion circuits 331A and 331B constitute an element that adjusts signal quality interposed in a data line (TMDS line).

Furthermore, in the source side plug of the HDMI cable 330A, 3.3 V obtained by the LDO regulator 332A is applied as a bias voltage to a data line (TMDS line) through a termination resistor of 50Ω. Moreover, in the sink side plug of the HDMI cable 330A, a current drive unit 333B is provided for transmitting a signal differentially on the basis of a differential signal obtained from the conversion circuit 331B.

Figure 3:
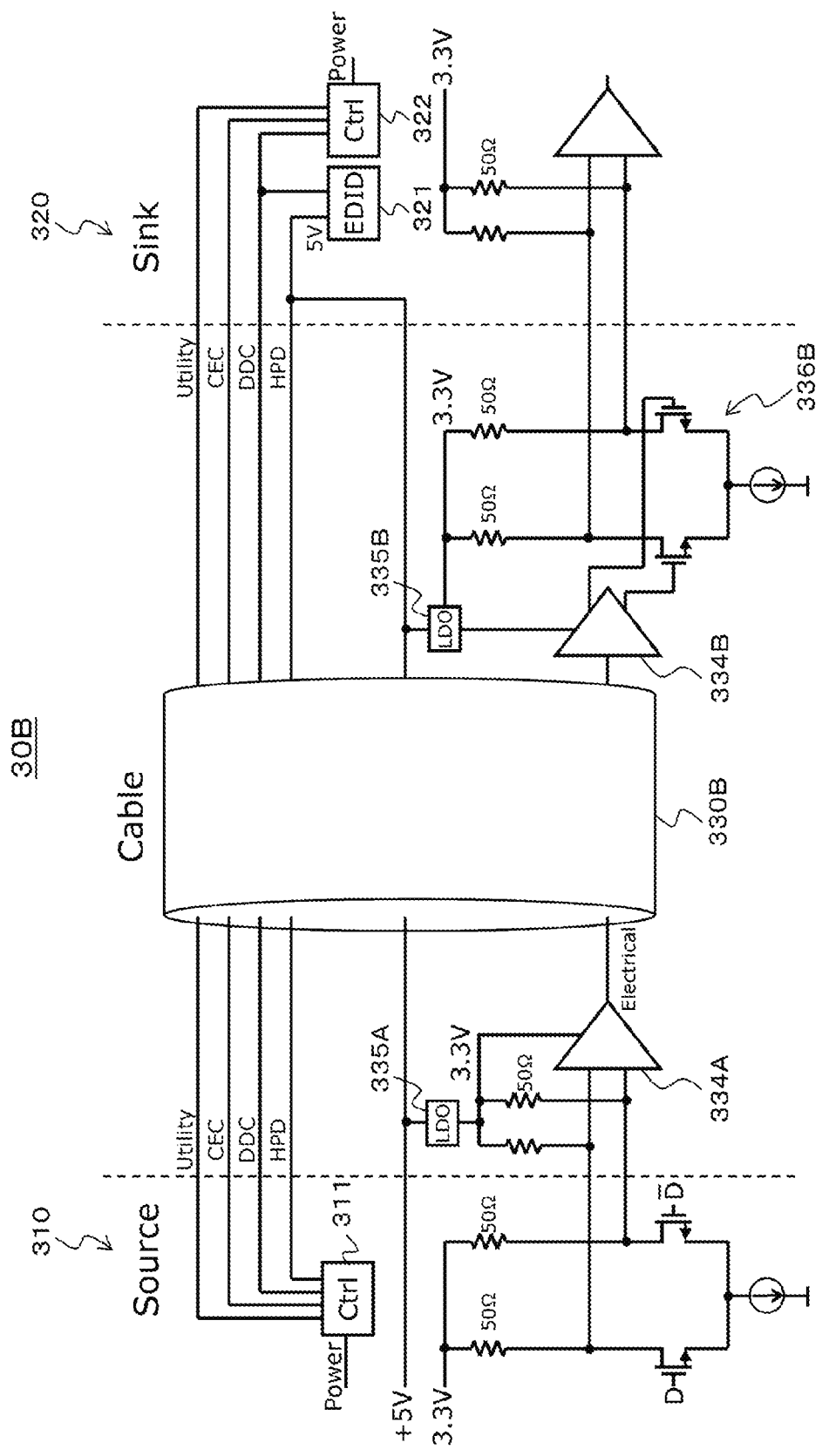
FIG. 3 is a diagram illustrating a configuration example of a transmission system in a case where an HDMI cable that is an ACC is used.

FIG. 3 illustrates a configuration example of a transmission system 30B in a case where an HDMI cable 330B that is an ACC is used. In FIG. 3, portions corresponding to those in FIGS. 1 and 2 are denoted by the same reference numerals, and detailed description thereof is omitted.

In the case of the transmission system 30B, circuits 334A and 334B for driving electrical 50Ω wiring exist in respective plugs on both sides of the HDMI cable 330B. These circuits 334A and 334B are supplied with 3.3 V power sources obtained by LDO regulators 335A and 335B from +5 V of the +5 V power line. Note that, these circuits 334A and 334B constitute an element that adjusts signal quality interposed in the data line (TMDS line).

Furthermore, in a source side plug of the HDMI cable 330B, 3.3 V obtained by the LDO 335A is applied as a bias voltage to the data line (TMDS line) through a termination resistor of 50Ω. Moreover, in a sink side plug of the HDMI cable 330B, a current drive unit 336B is provided for transmitting a signal differentially on the basis of a differential signal obtained from the conversion circuit 334B.

After reading the EDID, the sink device 320 does not need to draw as much as 50 mA from the +5 V power line, and about 10 mA is sufficient. At this time, in the cable, power can be used related to an unused portion in the sink device for the minimum 55 mA of the amount of current supply of the source device.

First Embodiment

Figure 4:
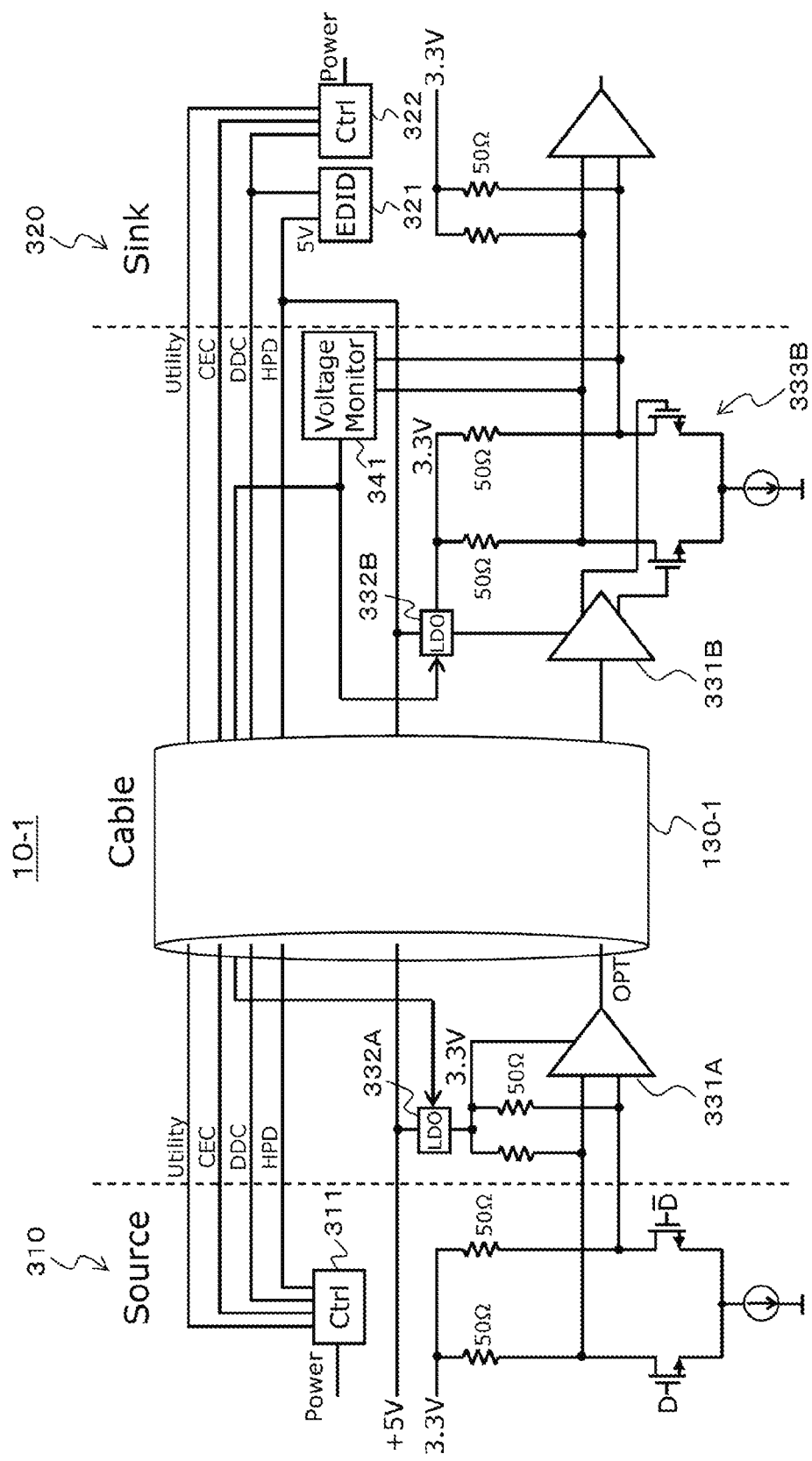
FIG. 4 is a diagram illustrating a configuration example of a transmission system as a first embodiment.

FIG. 4 illustrates a configuration example of a transmission system 10-1 as a first embodiment. The first embodiment is an HDMI transmission system using HDMI as a digital interface. The transmission system 10-1 includes the source device 310 as a transmission device, the sink device 320 as a reception device, and an HDMI cable 130-1 that is an AOC that connects these devices to each other. In FIG. 4, portions corresponding to those in FIG. 2 are denoted by the same reference numerals, and detailed description thereof is omitted as appropriate.

In the case of the transmission system 10-1, the conversion circuit 331A for converting electricity into light exists in a source side plug of the HDMI cable 130-1, and furthermore, the conversion circuit 331B for converting light into electricity exists in a sink side plug of the HDMI cable 130-1. These conversion circuits 331A and 331B are supplied with the 3.3 V power sources obtained by the LDO regulators 332A and 332B from +5 V of the +5 V power line. Note that, these conversion circuits 331A and 331B constitute an element that adjusts signal quality interposed in the data line (TMDS line).

Furthermore, in the source side plug of the HDMI cable 130-1, 3.3 V obtained by the LDO regulator 332A is applied as a bias voltage to the data line (TMDS line) through a termination resistor of 50Ω. Moreover, in the sink side plug of the HDMI cable 130-1, the current drive unit 333B is provided for transmitting the signal differentially on the basis of the differential signal obtained from the conversion circuit 331B.

A voltage monitor unit 341 is provided in the sink side plug of the HDMI cable 130-1. The voltage monitor unit 341 monitors the voltage of the data line on the sink side to determine whether or not 3.3 V in the sink device 320 has risen, and recognizes whether or not the sink device 320 is in the operating state.

The voltage monitor unit 341 sends detection information that the sink device 320 is in the operating state to the LDO regulator 332B, as a control signal. The LDO regulator 332B changes from the non-operating state (Disable) to the operating state (Enable) in response to the detection information to generate 3.3 V, and supplies the 3.3 V power source to the conversion circuit 331B and the current drive unit 333B. Therefore, the stop state is canceled of current consumption of a current consumption unit in the sink side plug of the HDMI cable 130-1.

Furthermore, the voltage monitor unit 341 superimposes the detection information that the sink device 320 is in the operating state on the DDC line, CEC line, HPD line, Utility line, or the like defined in the HDMI standard, and sends the information as a control signal to the LDO regulator 332A in the source side plug. The LDO regulator 332A is caused to be in the operating state in response to the detection information to generate 3.3 V, supplies the 3.3 V power source to the conversion circuit 331A, and applies the 3.3 V as the bias voltage to the data line (TMDS line) through the termination resistor of 50Ω. Therefore, the stop state is canceled of current consumption of a current consumption unit in the source side plug of the HDMI cable 130-1.

When the HDMI cable 130-1 is connected to the source device 310 and the sink device 320, a voltage of 5 V is transmitted from the source device 310 to the sink device 320 via the +5 V power line, and when 5 V is detected in the sink device 320, 5 V is transmitted from the sink device 320 to the source device 310 via the HPD line, whereby the source device 310 is informed that the cable is correctly connected. When detecting 5 V of the HPD line, the control unit 311 of the source device 310 determines that the cable is connected, and reads the EDID in the EDID ROM 321 on the sink device 320 side by using the DDC line.

At this time point, the LDO regulators 332A and 332B of the HDMI cable 130-1 each are not in the operating state, and the current consumption unit in each of the source side plug and the sink side plug of the HDMI cable 130-1 is in the stop state of the current consumption. Therefore, the sink device 320 can draw a current required for the EDID ROM 321 from the source device 310 via the HDMI cable 130-1, and it is avoided that the EDID function is adversely affected.

Thereafter, when the sink device 320 enters the operating state, 3.3 V in the sink device 320 rises. The voltage monitor unit 341 recognizes the rise of 3.3 V and sends the detection information that the sink device 320 is in the operating state to the LDO regulators 332A and 332B, as a control signal. Therefore, the LDO regulators 332A and 332B each enter the operating state, and the stop state is canceled of the current consumption of the current consumption unit in each of the source side plug and the sink side plug of the HDMI cable 130-1. Therefore, the current is consumed by the HDMI cable 130-1, and a value is reduced of the current that can be drawn from the source device 310 by the sink device 320. However, since the sink device 320 is already in the operating state and a required current value is small, there is no problem.

After the sink device 320 has entered the operating state, using a control line such as the DDC line, exchange of signals such as a High-bandwidth Digital Content Protection System (HDCP) is started between the source device 310 and the sink device 320, and transmission of TMDS data by using the TMDS channel is started in one direction from the source device 310 to the sink device 320.

In the transmission system 10-1 illustrated in FIG. 4, the HDMI cable 130-1 detects that the sink device 320 is in the operating state, and cancels the stop state of the current consumption of the current consumption unit in each of the source side plug and the sink side plug in response to the detection information. Therefore, it is possible to satisfactorily consume the current in the current consumption unit without adversely affecting operations such as EDID reading before the operating state of the sink device 320.

Second Embodiment

Figure 5:
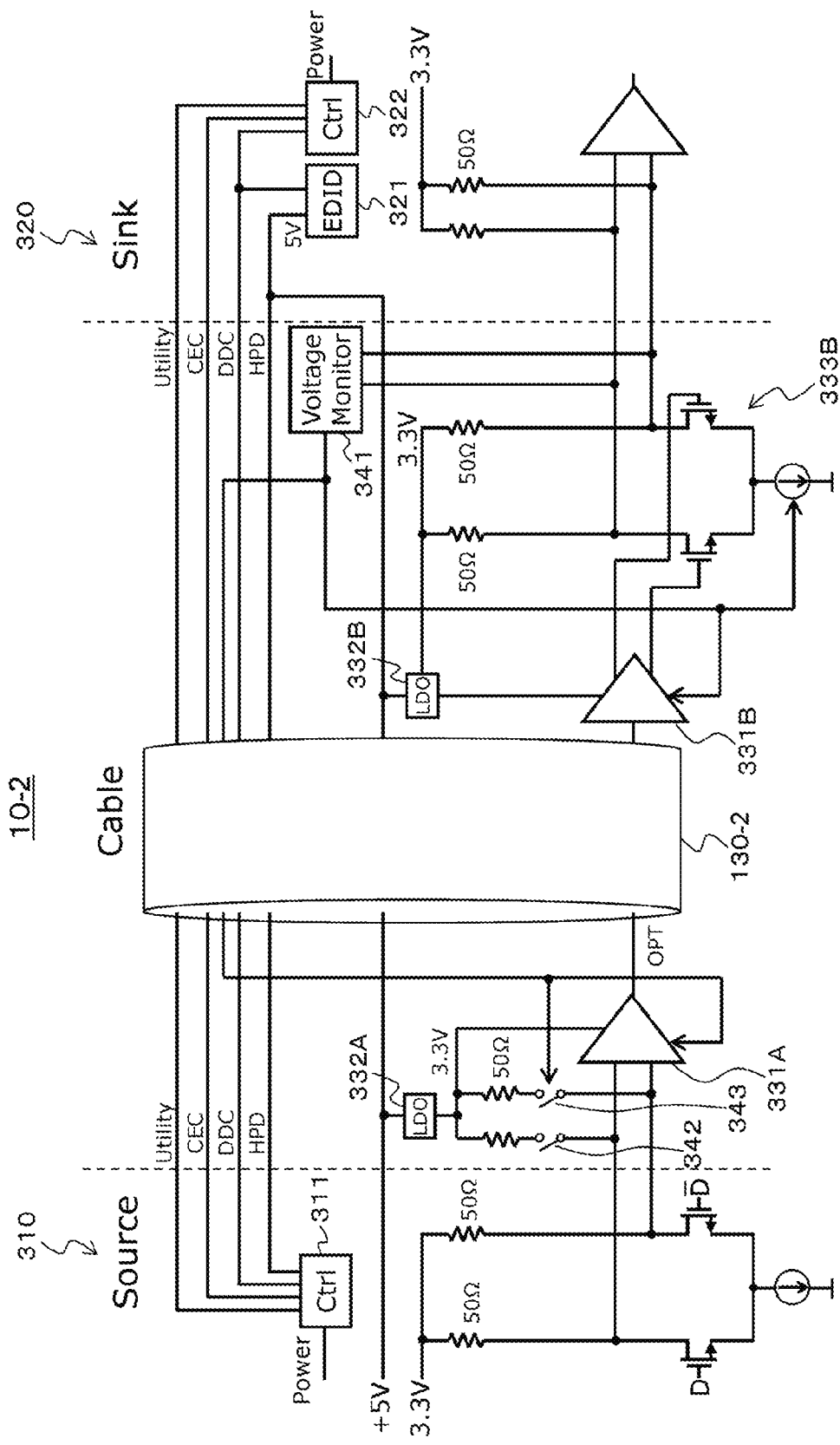
FIG. 5 is a diagram illustrating a configuration example of a transmission system as a second embodiment.

FIG. 5 illustrates a configuration example of a transmission system 10-2 as a second embodiment. The transmission system 10-2 is an HDMI transmission system using HDMI as a digital interface. The transmission system 10-2 includes the source device 310 as a transmission device, the sink device 320 as a reception device, and an HDMI cable 130-2 that is an AOC that connects these devices to each other. In FIG. 5, portions corresponding to those in FIG. 4 are denoted by the same reference numerals, and detailed description thereof is omitted as appropriate.

In the transmission system 10-1 illustrated in FIG. 4 described above, operations of the LDO regulators 332A and 332B are controlled on the basis of the detection information that the sink device 320 is in the operating state from the voltage monitor unit 341. In the transmission system 10-1 illustrated in FIG. 5, each circuit that consumes current is controlled from the non-operating state to the operating state on the basis of the detection information, and the stop state of the current consumption is canceled.

That is, in the sink side plug, the detection information from the voltage monitor unit 341 is supplied as a control signal to the conversion circuit 331B, and also supplied as a control signal to a constant current circuit of the current drive unit 333B. Therefore, the conversion circuit 331B and the constant current circuit of the current drive unit 333B each enter the operating state after the sink device 320 enters the operating state.

Furthermore, in the source side plug, the detection information from the voltage monitor unit 341 is supplied as a control signal to the conversion circuit 331A, and also supplied as a control signal to switches 342 and 343 inserted in series with respective termination resistors of 50Ω. Therefore, the conversion circuit 331A enters the operating state after the sink device 320 enters the operating state. Furthermore, the switches 342 and 343 are caused to be in the on (closed) state after the sink device 320 enters the operating state, and a current flows from the HDMI cable 130-2 to the source device 310 via the data line (TMDS line).

Also in the transmission system 10-2 illustrated in FIG. 5, it is detected that the sink device 320 is in the operating state, and the stop state is canceled of current consumption of a current consumption unit in each of the source side plug and the sink side plug in response to the detection information. Therefore, it is possible to satisfactorily consume the current in the current consumption unit without adversely affecting operations such as EDID reading before the operating state of the sink device 320.

Third Embodiment

Figure 6:
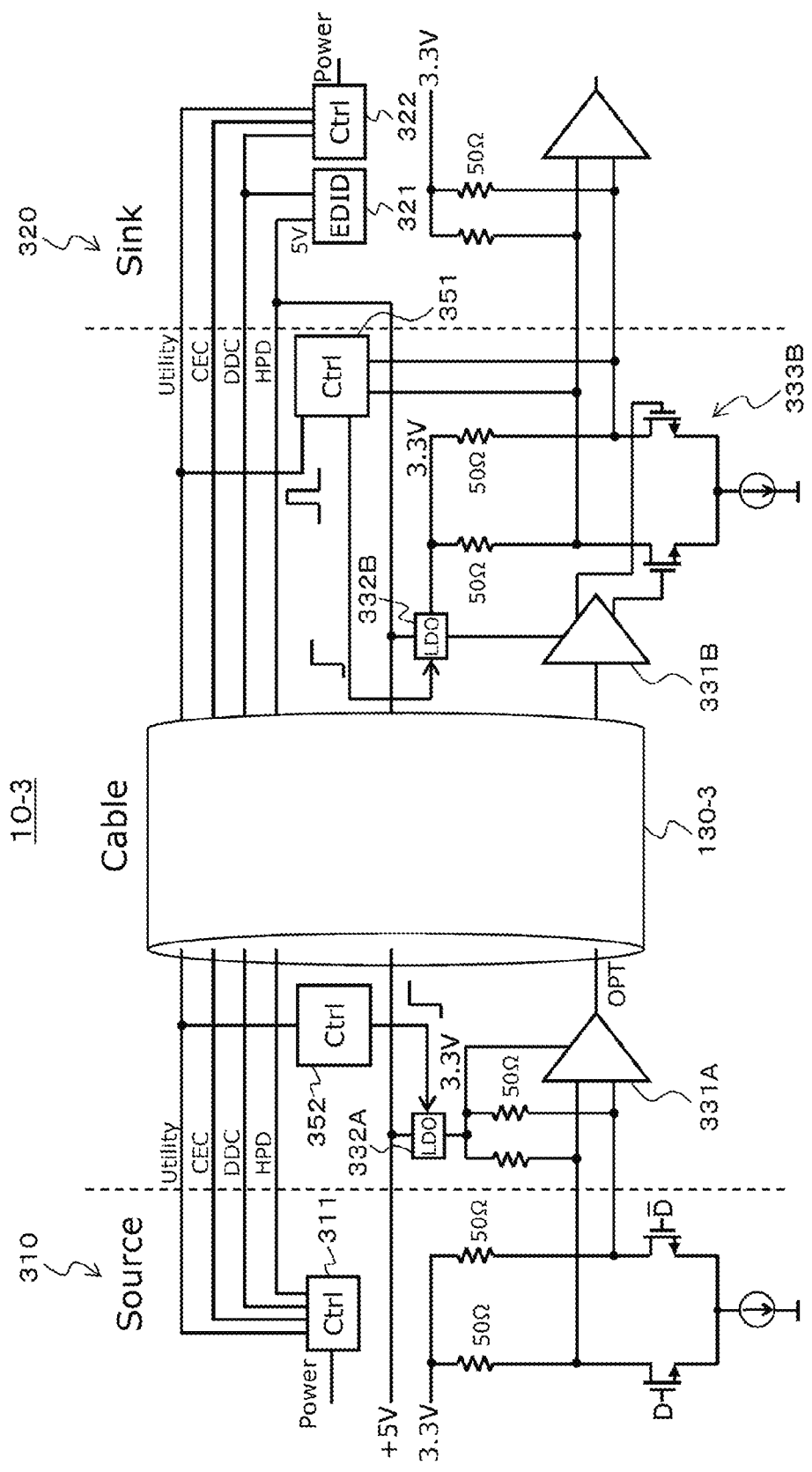
FIG. 6 is a diagram illustrating a configuration example of a transmission system as a third embodiment.

FIG. 6 illustrates a configuration example of a transmission system 10-3 as a third embodiment. The transmission system 10-3 is an HDMI transmission system using HDMI as a digital interface. The transmission system 10-3 includes the source device 310 as a transmission device, the sink device 320 as a reception device, and an HDMI cable 130-3 that is an AOC that connects these devices to each other. In FIG. 6, portions corresponding to those in FIG. 4 are denoted by the same reference numerals, and detailed description thereof is omitted as appropriate.

A control unit 351 is provided in the sink side plug of the HDMI cable 130-3. The control unit 351 monitors the voltage of the data line on the sink side to determine whether or not 3.3 V in the sink device 320 has risen, and recognizes whether or not the sink device 320 is in the operating state.

The control unit 351 sends the detection information that the sink device 320 is in the operating state to the source side plug by superimposing the information on the Utility line considered to have the least influence on the source device 310 and the sink device 320. In this case, the control unit 351 transmits the detection information as a pulse signal.

Furthermore, the control unit 351 sends rise information of the pulse signal to the LDO regulator 332B, as a control signal. The LDO regulator 332B enters the operating state at the rise of the pulse signal, and the stop state is canceled of current consumption of a current consumption unit in the sink side plug of the HDMI cable 130-1.

Furthermore, a control unit 352 is provided in the source side plug of the HDMI cable 130-3. The control unit 352 detects the rise of the pulse signal transmitted from the sink side plug through the Utility line, and sends the information as a control signal to the LDO regulator 332A. The LDO regulator 332A enters the operating state at the rise of the pulse signal, and the stop state is canceled of current consumption of a current consumption unit in the source side plug of the HDMI cable 130-3.

Also in the transmission system 10-3 illustrated in FIG. 6, it is detected that the sink device 320 is in the operating state, and the stop state is canceled of the current consumption of the current consumption unit in each of the source side plug and the sink side plug in response to the detection information. Therefore, it is possible to satisfactorily consume the current in the current consumption unit without adversely affecting operations such as EDID reading before the operating state of the sink device 320.

Fourth Embodiment

Figure 7:
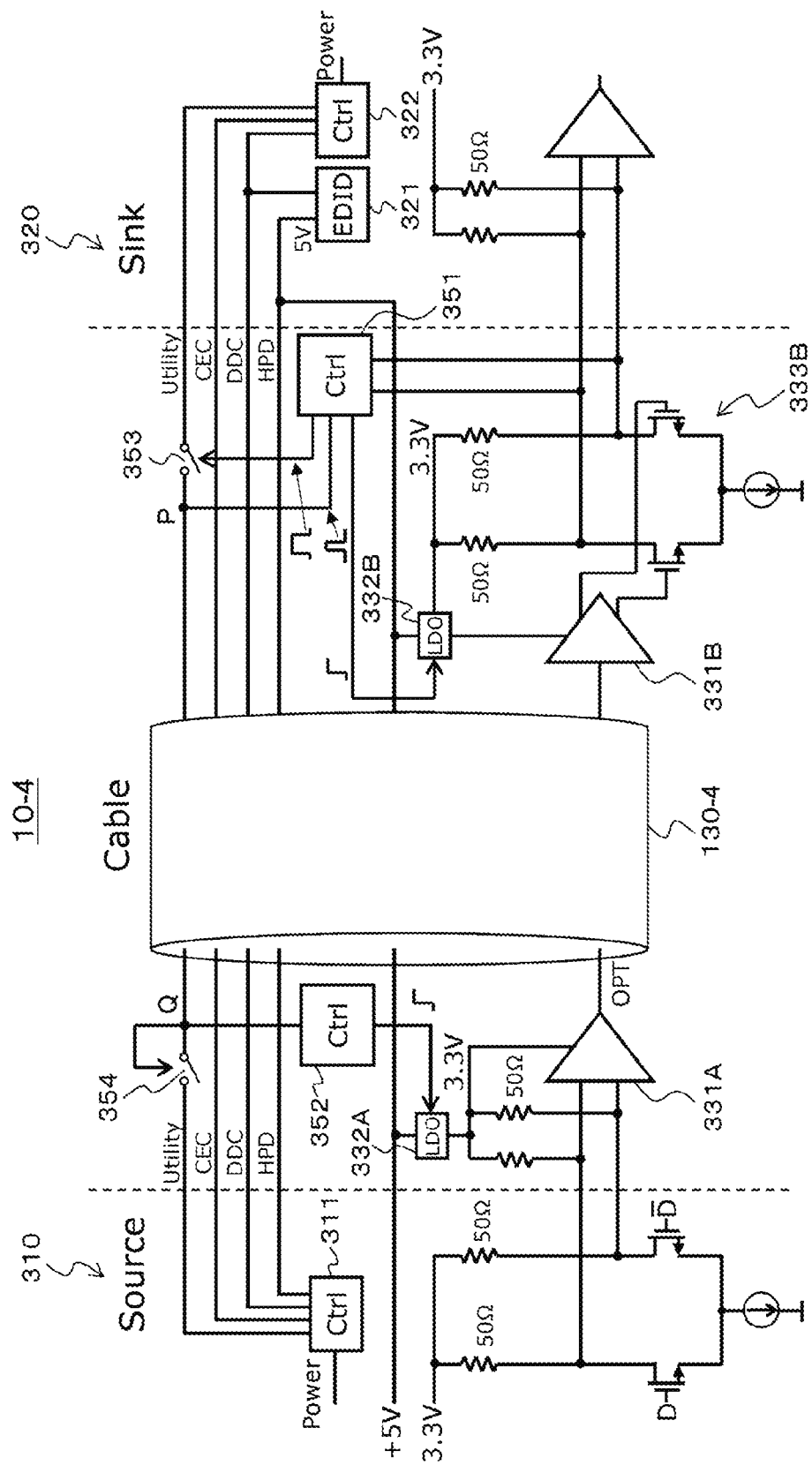
FIG. 7 is a diagram illustrating a configuration example of a transmission system as a fourth embodiment.

FIG. 7 illustrates a configuration example of a transmission system 10-4 as a fourth embodiment. The transmission system 10-4 is an HDMI transmission system using HDMI as a digital interface. The transmission system 10-4 includes the source device 310 as a transmission device, the sink device 320 as a reception device, and an HDMI cable 130-4 that is an AOC that connects these devices to each other. In FIG. 7, portions corresponding to those in FIG. 6 are denoted by the same reference numerals, and detailed description thereof is omitted as appropriate.

In the transmission system 10-3 illustrated in FIG. 6 described above, the pulse signal superimposed on the Utility line is also transmitted to the source device 310 and the sink device 320. Therefore, there is a possibility that the source device 310 and the sink device 320 malfunction due to unintended information. The transmission system 10-4 illustrated in FIG. 7 is configured so that the pulse signal superimposed on the Utility line is not transmitted to the source device 310 and the sink device 320.

In the sink side plug, a switch 353 is provided on the Utility line. The switch 353 is arranged closer to the sink device 320 side than a superimposed position P of the pulse signal from the control unit 351. Furthermore, in the source side plug, a switch 354 is provided on the Utility line. The switch 354 is arranged closer to the source device 310 side than an extraction position Q of the pulse signal in the control unit 352.

These switches 353 and 354 are in the off (open) state in the initial state. Then, the switches each are caused to be in the on (closed) state after the fall of the pulse signal superimposed on the Utility line from the control unit 351. Therefore, when the switches 353 and 354 each are in the off (opened) state, the pulse signal can be transmitted for causing the LDO regulator 332A in the source side plug to be in the operating state, and it is avoided that the pulse signal is transmitted to the source device 310 and the sink device 320.

Note that, by detecting and resetting the 5 V signal that is the connection detection signal (HPD signal) obtained on the HPD line when the HDMI cable 130-4 is connected, the switches 353 and 354 are always reset when the HDMI cable 130-4 is connected, and the switches 353 and 354 each are in the initial state.

Also in the transmission system 10-4 illustrated in FIG. 7, it is detected that the sink device 320 is in the operating state, and the stop state is canceled of current consumption of a current consumption unit in each of the source side plug and the sink side plug in response to the detection information. Therefore, it is possible to satisfactorily consume the current in the current consumption unit without adversely affecting operations such as EDID reading before the operating state of the sink device 320.

Fifth Embodiment

Figure 8:
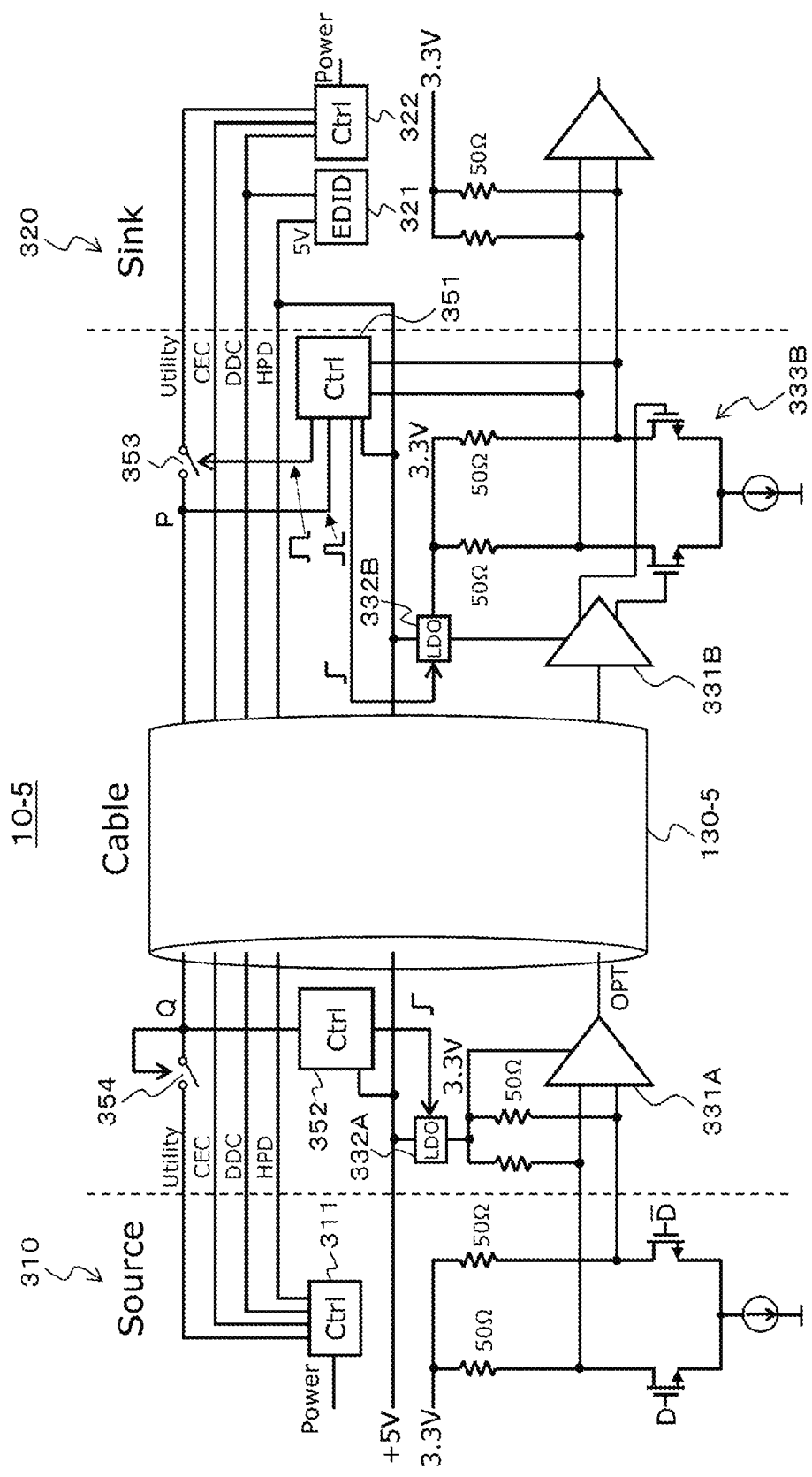
FIG. 8 is a diagram illustrating a configuration example of a transmission system as a fifth embodiment.

FIG. 8 illustrates a configuration example of a transmission system 10-5 as a fifth embodiment. The transmission system 10-5 is an HDMI transmission system using HDMI as a digital interface. The transmission system 10-5 includes the source device 310 as a transmission device, the sink device 320 as a reception device, and an HDMI cable 130-5 that is an AOC that connects them to each other. In FIG. 8, portions corresponding to those in FIG. 7 are denoted by the same reference numerals, and detailed description thereof is omitted as appropriate.

In the transmission systems 10-3 and 10-4 illustrated in FIGS. 6 and 7, regarding power sources of the control units 351 and 352 provided in the sink side plug and the source side plug, the power sources may be directly supplied from the +5 V power line, or may be supplied from 5 V of the HPD line output from the sink device 320. In the transmission system 10-5 illustrated in FIG. 8, an example is illustrated in which the power sources of the control units 351 and 352 are supplied from the +5 V power line.

Also in the transmission system 10-5 illustrated in FIG. 8, an effect can be obtained similar to that in the transmission system 10-4 illustrated in FIG. 7.

Sixth Embodiment

Figure 9:
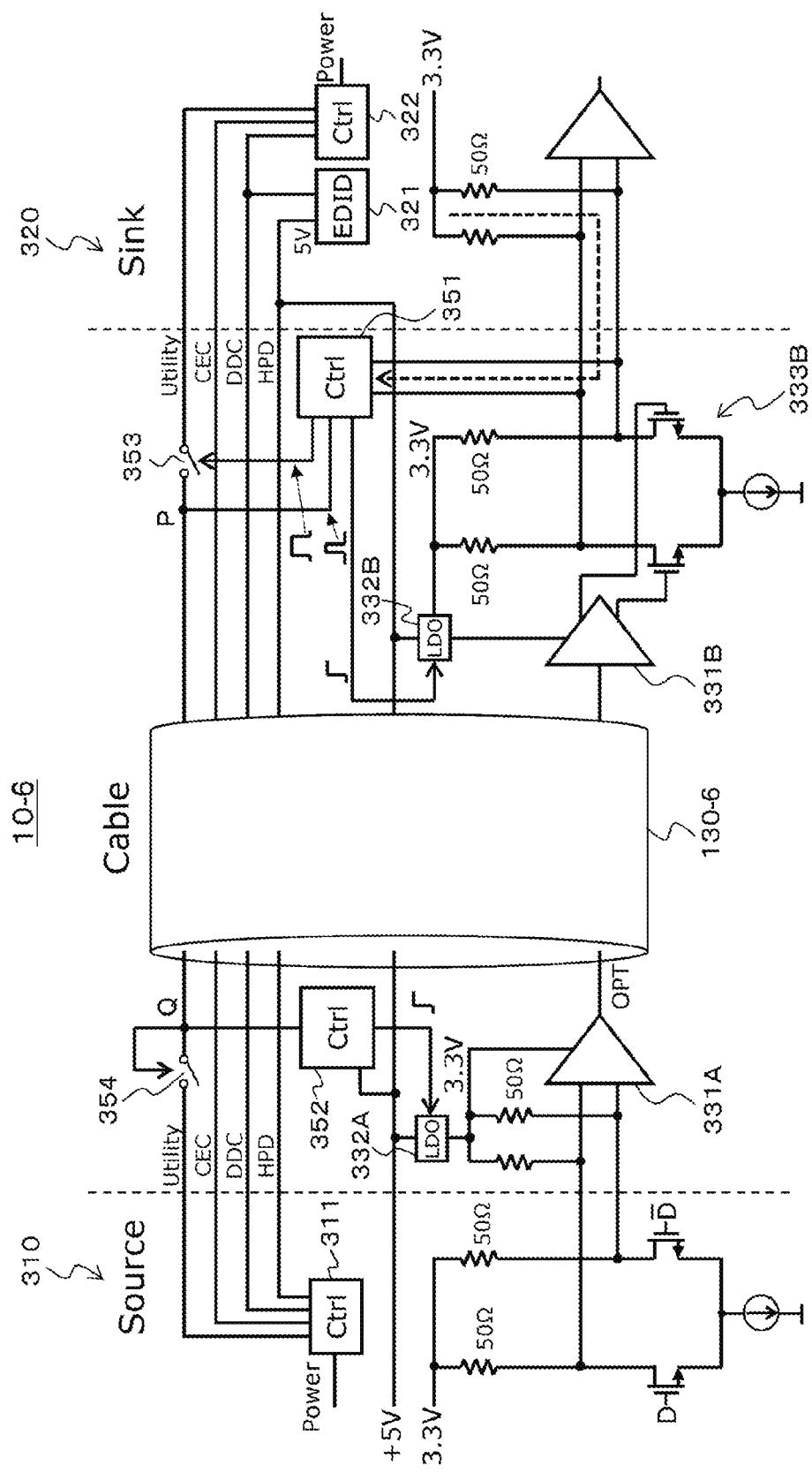
FIG. 9 is a diagram illustrating a configuration example of a transmission system as a sixth embodiment.

FIG. 9 illustrates a configuration example of a transmission system 10-6 as a sixth embodiment. The transmission system 10-6 is an HDMI transmission system using HDMI as a digital interface. The transmission system 10-6 includes the source device 310 as a transmission device, the sink device 320 as a reception device, and an HDMI cable 130-6 that is an AOC that connects them to each other. In FIG. 9, portions corresponding to those in FIG. 8 are denoted by the same reference numerals, and detailed description thereof is omitted as appropriate.

In the transmission system 10-5 illustrated in FIG. 8 described above, the power source of the control unit 351 provided in the sink side plug is supplied from the +5 V power line. In the transmission system 10-6 illustrated in FIG. 9, regarding the power source of the control unit 351, a current is drawn from the 3.3 V power source in the sink device 320, and a power source is newly generated by using a DC/DC converter (not illustrated) or the like.

Also in the transmission system 10-6 illustrated in FIG. 9, an effect can be obtained similar to that in the transmission system 10-5 illustrated in FIG. 8.

Seventh Embodiment

Figure 10:
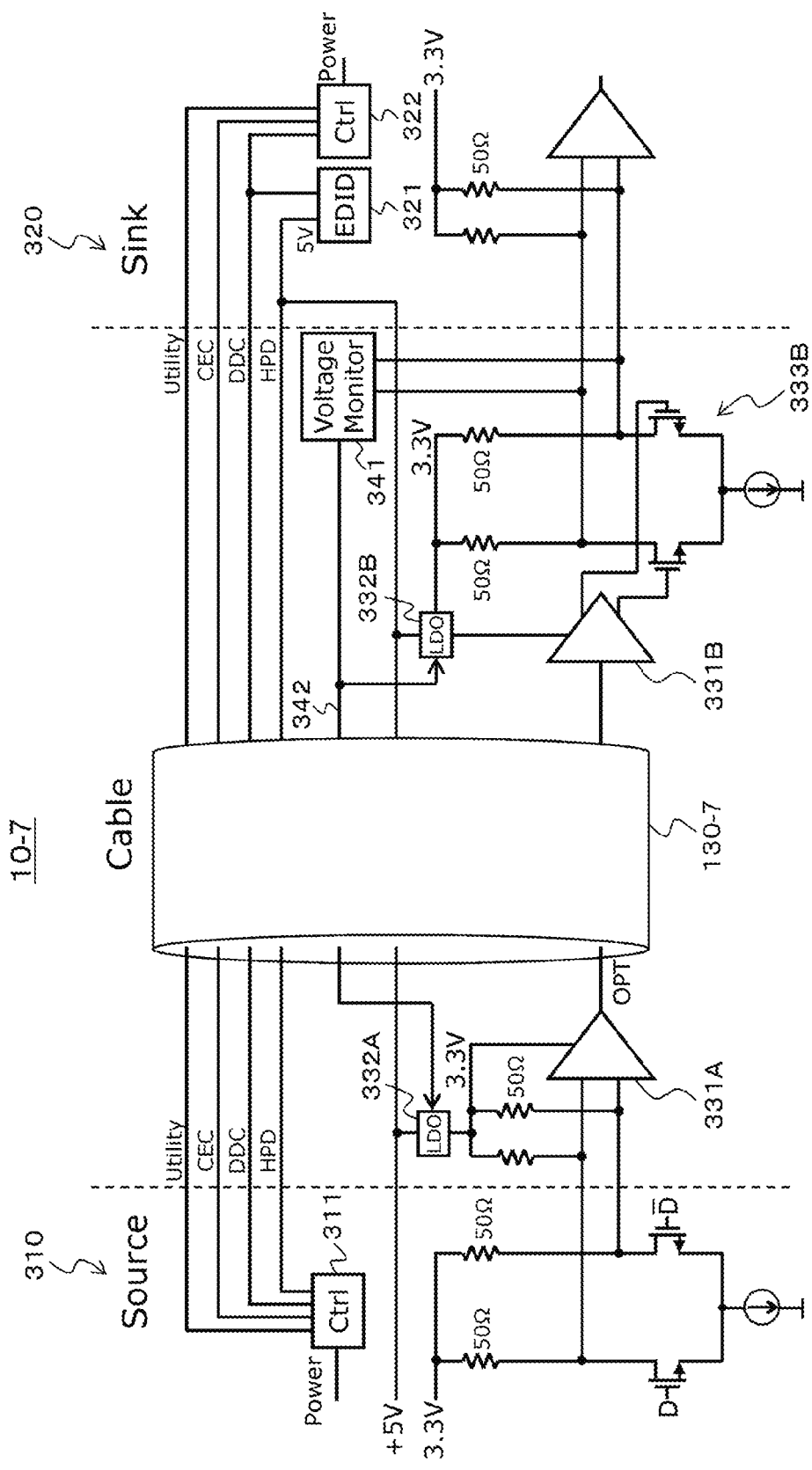
FIG. 10 is a diagram illustrating a configuration example of a transmission system as a seventh embodiment.

FIG. 10 illustrates a configuration example of a transmission system 10-7 as a seventh embodiment. The transmission system 10-7 is an HDMI transmission system using HDMI as a digital interface. The transmission system 10-7 includes the source device 310 as a transmission device, the sink device 320 as a reception device, and an HDMI cable 130-7 that is an AOC that connects these devices to each other. In FIG. 10, portions corresponding to those in FIG. 4 are denoted by the same reference numerals, and detailed description thereof is omitted as appropriate.

In the transmission system 10-1 illustrated in FIG. 4 described above, the detection information that the sink device 320 is in the operating state from the voltage monitor unit 341 in the sink side plug is superimposed on the DDC line, CEC line, HPD line, Utility line, or the like defined in the HDMI standard, and sent to the LDO regulator 332A in the source side plug.

In the transmission system 10-7 illustrated in FIG. 10, the detection information from the voltage monitor unit 351 is sent as a control signal to the LDO regulator 332A in the source side plug through a dedicated line 342. In this case, addition is performed only in the HDMI cable 130-7, and no additional HDMI connector pin is required, and the existing HDMI is not affected.

The transmission system 10-7 illustrated in FIG. 10 also operates similarly to the transmission system 10-1 illustrated in FIG. 4, and a similar effect can be obtained.

Eighth Embodiment

Figure 11:
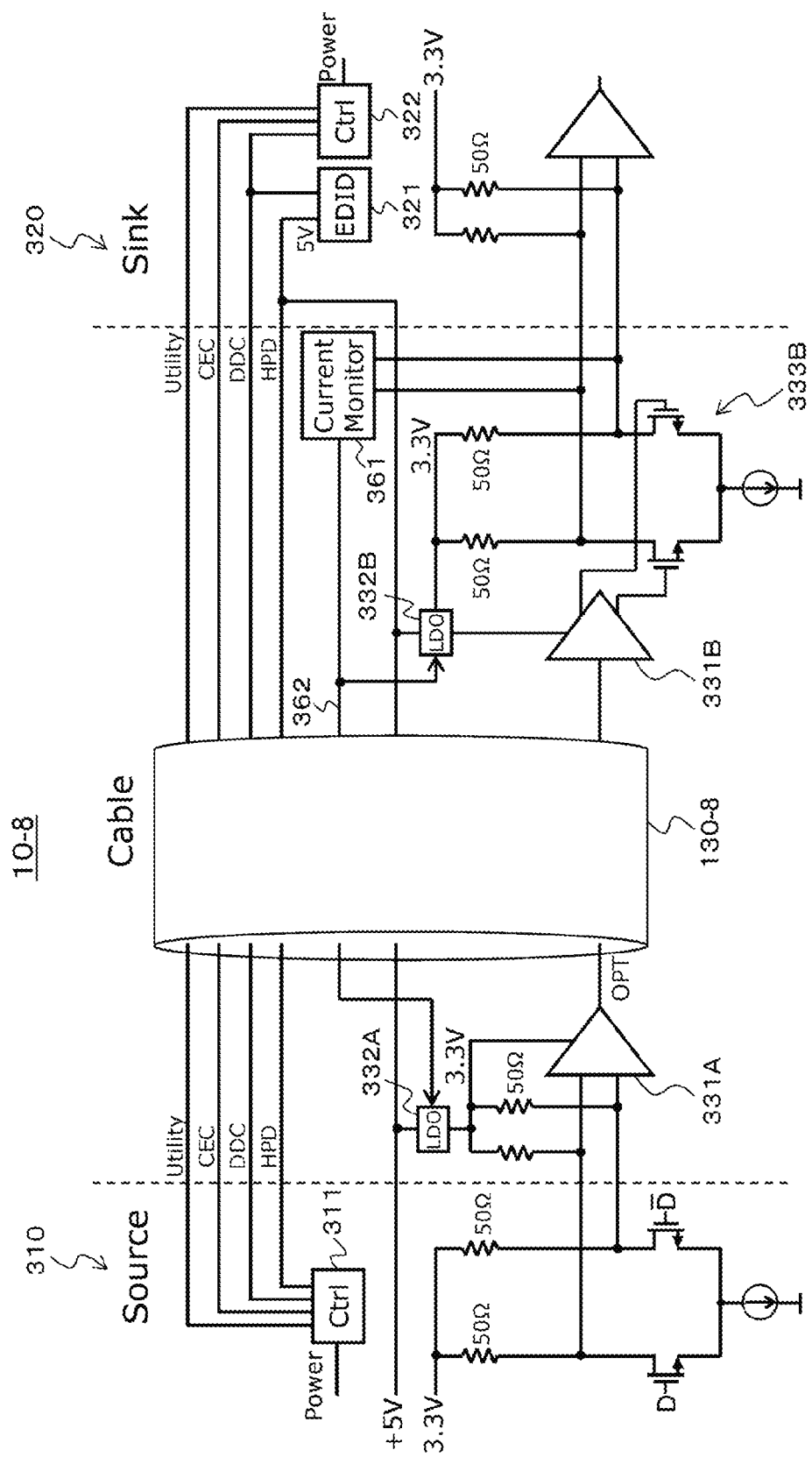
FIG. 11 is a diagram illustrating a configuration example of a transmission system as an eighth embodiment.

FIG. 11 illustrates a configuration example of a transmission system 10-8 as an eighth embodiment. The transmission system 10-8 is an HDMI transmission system using HDMI as a digital interface. The transmission system 10-8 includes the source device 310 as a transmission device, the sink device 320 as a reception device, and an HDMI cable 130-8 that is an AOC that connects them to each other. In FIG. 11, portions corresponding to those in FIG. 10 are denoted by the same reference numerals, and detailed description thereof is omitted as appropriate.

In each of the embodiments described above, monitoring is performed whether or not the voltage of the data line (TMDS line) is 3.3 V in the sink side plug, whereby it is determined whether or not the sink device 320 is in the operating state. In the transmission system 10-8 illustrated in FIG. 11, the current flowing from 3.3 V of the sink device 320 is monitored, and it is determined whether or not the sink device 320 is in the operating state.

A current monitor unit 361 is provided in the sink side plug of the HDMI cable 130-8. This current monitor unit 361 monitors the current flowing from 3.3 V of the sink device 320 to determine whether or not 3.3 V in the sink device 320 has risen, and recognizes whether or not the sink device 320 is in the operating state.

The current monitor unit 361 sends the detection information that the sink device 320 is in the operating state to the LDO regulator 332B, as a control signal. The LDO regulator 332B changes from the non-operating state (Disable) to the operating state (Enable) in response to the detection information to generate 3.3 V, and supplies the 3.3 V power source to the conversion circuit 331B and the current drive unit 333B. Therefore, the stop state is canceled of current consumption of a current consumption unit in the sink side plug of the HDMI cable 130-8.

Furthermore, the current monitor unit 361 sends the detection information that the sink device 320 is in the operating state to the LDO regulator 332A in the source side plug through a dedicated line 362, as a control signal. The LDO regulator 332A is caused to be in the operating state in response to the detection information to generate 3.3 V, supplies the 3.3 V power source to the conversion circuit 331A, and applies the 3.3 V as the bias voltage to the data line (TMDS line) through the termination resistor of 50Ω. Therefore, the stop state is canceled of current consumption of a current consumption unit in the source side plug of the HDMI cable 130-8.

Figure 12:
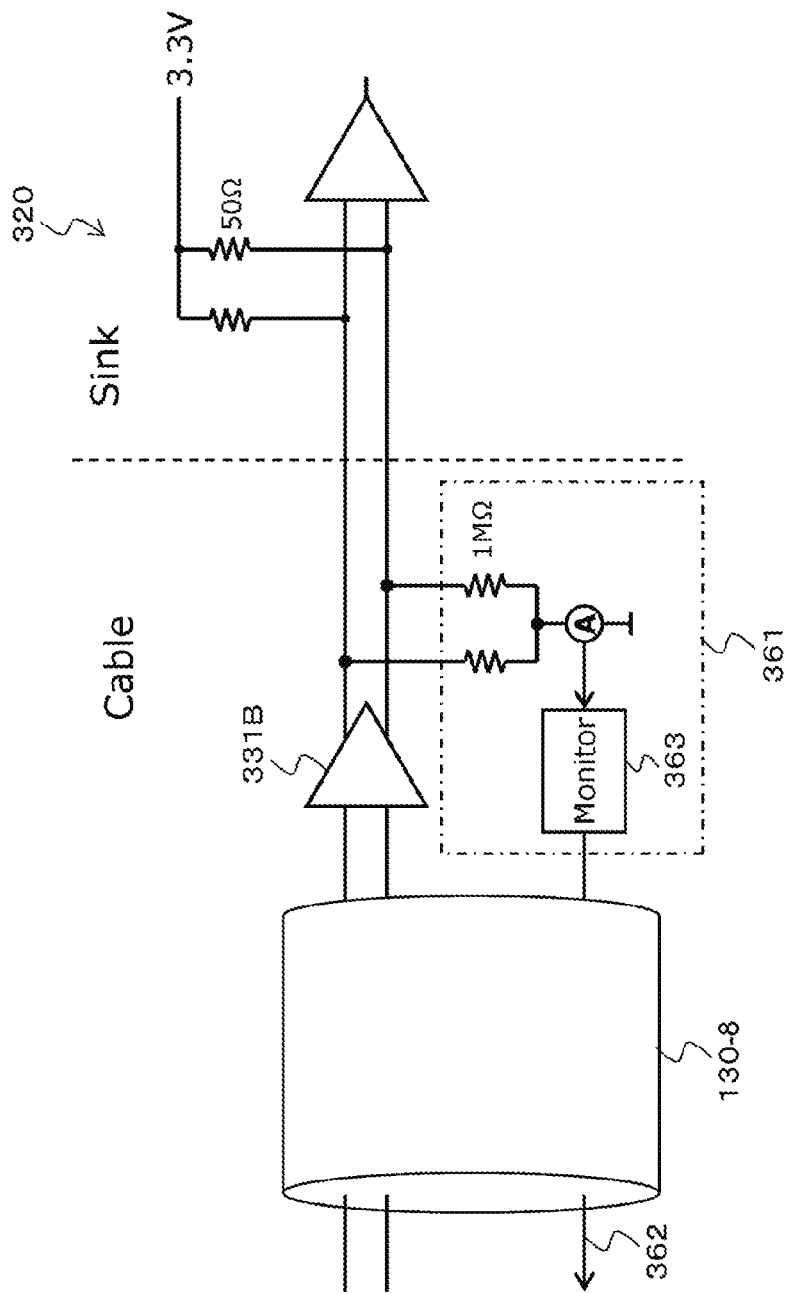
FIG. 12 is a diagram illustrating a configuration example of a current monitor unit.

FIG. 12 illustrates a configuration example of the current monitor unit 361. In this configuration, a high resistance resistor (for example, 1 MΩ) is sandwiched between the data line (TMDS line) and GND, and a minute current flowing through the additional resistor is monitored by a monitor unit 363. Here, if the high resistance is 1 MΩ, the current flowing through the additional resistor is about 3.3 μA (=3.3/(1 M+50)), so that the influence on the data line can be ignored.

The transmission system 10-8 illustrated in FIG. 11 also operates similarly to the transmission system 10-7 illustrated in FIG. 10, and a similar effect can be obtained.

Ninth Embodiment

Figure 13:
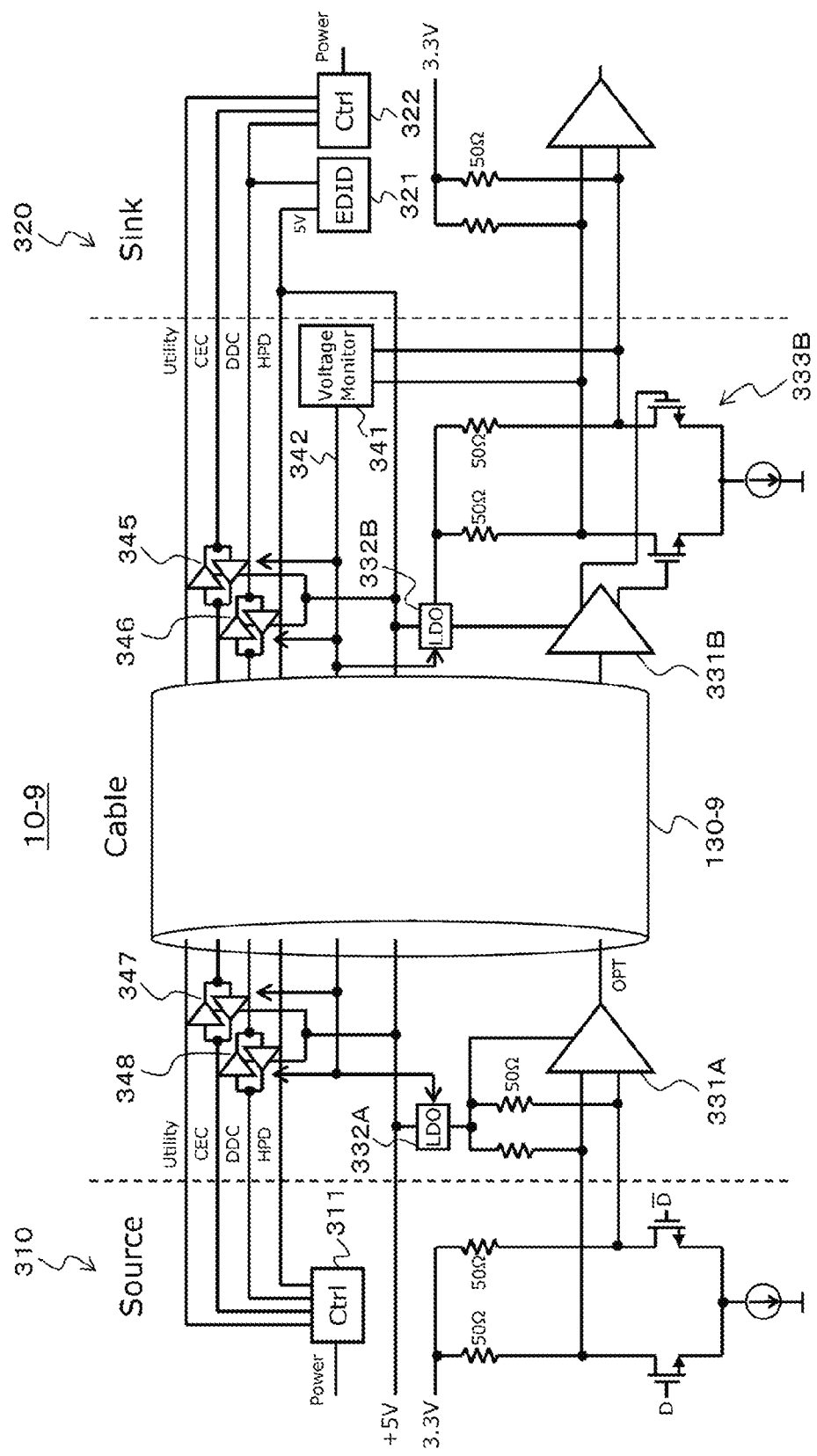
FIG. 13 is a diagram illustrating a configuration example of a transmission system as a ninth embodiment.

FIG. 13 illustrates a configuration example of a transmission system 10-9 as a ninth embodiment. The transmission system 10-9 is an HDMI transmission system using HDMI as a digital interface. The transmission system 10-9 includes the source device 310 as a transmission device, the sink device 320 as a reception device, and an HDMI cable 130-9 that is an AOC that connects these devices to each other. In FIG. 13, portions corresponding to those in FIG. 10 are denoted by the same reference numerals, and detailed description thereof is omitted as appropriate.

In each of the above-described embodiments, consumption is controlled of a current for driving a high-speed signal line. In the transmission system 10-9 illustrated in FIG. 13, moreover, consumption is also controlled of a current for driving a control signal line.

Bidirectional buffers 345 and 346 are inserted into the CEC line and the DDC line in the sink side plug of the HDMI cable 130-9. The voltage monitor unit 341 sends the detection information that the sink device 320 is in the operating state to the bidirectional buffers 345 and 346, as a control signal. The bidirectional buffers 345 and 346 each change from the off (Disable) state to the on (Enable) state in response to the detection information, and the stop state of the current consumption is canceled.

Bidirectional buffers 347 and 348 are inserted into the CEC line and the DDC line in the source side plug of the HDMI cable 130-9. The voltage monitor unit 341 sends the detection information that the sink device 320 is in the operating state to the bidirectional buffers 347 and 348 through the dedicated line 342, as a control signal. The bidirectional buffers 347 and 348 each change from the off (Disable) state to the on (Enable) state in response to the detection information, and the stop state of the current consumption is canceled.

Also in the transmission system 10-9 illustrated in FIG. 13, the HDMI cable 130-9 detects that the sink device 320 is in the operating state, and cancels the stop state of current consumption of a current consumption unit in each of the source side plug and the sink side plug in response to the detection information. Therefore, it is possible to satisfactorily consume the current in the current consumption unit without adversely affecting operations such as EDID reading before the operating state of the sink device 320.

Tenth Embodiment

Figure 14:
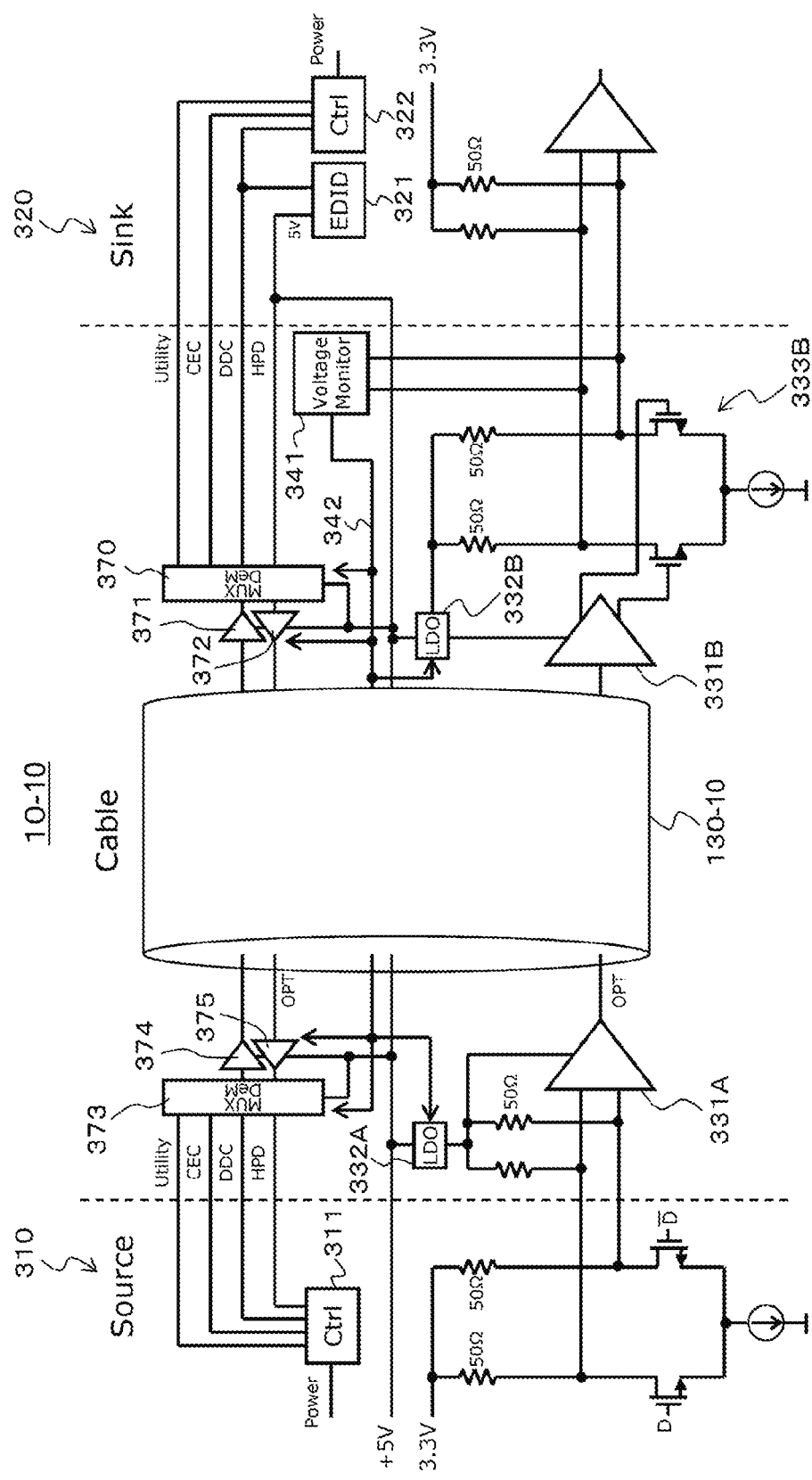
FIG. 14 is a diagram illustrating a configuration example of a transmission system as a tenth embodiment.

FIG. 14 illustrates a configuration example of a transmission system 10-10 as a tenth embodiment. The transmission system 10-10 is an HDMI transmission system using HDMI as a digital interface. The transmission system 10-10 includes the source device 310 as a transmission device, the sink device 320 as a reception device, and an HDMI cable 130-10 that is an AOC that connects these devices to each other. In FIG. 14, portions corresponding to those in FIG. 13 are denoted by the same reference numerals, and detailed description thereof is omitted as appropriate.

The transmission system 10-9 illustrated in FIG. 13 is an example in which each control signal is transmitted on an individual line, but the transmission system 10-10 illustrated in FIG. 14 is an example in which optical transmission of each control signal is performed by one transmission line using a multiplexer/demultiplexer (MUX/DeM).

In this case, a multiplexer/demultiplexer 370, a conversion circuit 371 that converts light into electricity, and a conversion circuit 372 that converts electricity into light are arranged in the sink side plug of the HDMI cable 130-10. The voltage monitor unit 341 sends the detection information that the sink device 320 is in the operating state to the multiplexer/demultiplexer 370 and the conversion circuits 371 and 372, as a control signal. These circuits each enter the operating state in response to the detection information, and the stop state of current consumption is canceled.

Furthermore, a multiplexer/demultiplexer 373, a conversion circuit 374 that converts electricity into light, and a conversion circuit 375 that converts light into electricity are arranged in the source side plug of the HDMI cable 130-10. The voltage monitor unit 341 sends the detection information that the sink device 320 is in the operating state to the multiplexer/demultiplexer 373 and the conversion circuits 374 and 375 through the dedicated line 342, as a control signal. These circuits each enter the operating state in response to the detection information, and the stop state of current consumption is canceled.

Also in the transmission system 10-10 illustrated in FIG. 14, the HDMI cable 130-10 detects that the sink device 320 is in the operating state, and cancels the stop state of current consumption of a current consumption unit in each of the source side plug and the sink side plug in response to the detection information. Therefore, it is possible to satisfactorily consume the current in the current consumption unit without adversely affecting operations such as EDID reading before the operating state of the sink device 320.

2. Modifications

Note that, in the above embodiment, as an example, the transmission system has been described in which the source device and the sink device are connected to each other by the HDMI cable. However, since the present technology can also be applied similarly to a cable using a mechanism defined in "VESA Plug and Display (P&D) Specification" between the transmission device and the reception device, the present technology can also be applied to DVI, MHL, Display Port, and the like. Furthermore, the present technology can be applied not only to AOC and ACC, but also to wireless communication and the like. Moreover, it goes without saying that the present technology can be similarly applied to a USB cable or the like.

Furthermore, the present technology may also be embodied in the configurations described below.

(1) A cable connected between a first device and a second device, the cable including:

a power line that supplies a current from the first device to the second device;

a current consumption unit that receives supply of a current from the first device through the power line;

a detection unit that detects that the second device is in an operating state; and a control unit that cancels a stop state of current consumption of the current consumption unit in response to the detection information.

(2) The cable according to (1), in which the current consumption unit is an element that adjusts signal quality interposed in a data line.

(3) The cable according to (1) or (2), in which the detection unit determines that the second device is in the operating state when a predetermined voltage is applied to the data line on the second device's side.

(4) The cable according to any of (1) to (3), in which the detection information from the detection unit is sent to the control unit through a predetermined line.

(5) The cable according to any of (1) to (4), in which the control unit controls the current consumption unit to an operating state in response to the detection information.

(6) The cable according to any of (1) to (4), in which the control unit controls a power source unit in the cable to an operating state in response to the detection information, the power source unit supplying a current to the current consumption unit.

(7) The cable according to any of (1) to (6), in which the first device is an HDMI transmitter, and the second device is an HDMI receiver.

(8) A connection device that connects a first device and a second device to each other, the connection device including:

a power line that supplies a current from the first device to the second device;

a current consumption unit that receives supply of a current from the first device through the power line;

a detection unit that detects that the second device is in an operating state; and a control unit that cancels a stop state of current consumption of the current consumption unit in response to the detection information.

REFERENCE SIGNS LIST

10-1 to 10-10 Transmission system
130-1 to 130-10 HDMI cable
310 Source device
311 Control unit
312 Voltage monitor unit
320 Sink device
321 EDID ROM
322 Control unit
331A, 331B Conversion circuit
332A, 332B LDO regulator
333B Current drive unit
341 Voltage monitor unit
342 Dedicated line
345, 346, 347, 348 Bidirectional buffer
351, 352 Control unit
353, 354 Switch
361 Current monitor unit
362 Dedicated line
363 Monitor unit
370, 373 Multiplexer/demultiplexer
371, 372, 374, 375 Conversion circuit

The invention claimed is:

1. A cable connected between a first device and a second device, the cable comprising:

a power line configured to supply a current from the first device to the second device;

a current consumption unit configured to:
 receive the supply of the current from the first device through the power line, and
 adjust a signal quality interposed in a data line on a side of the first device;

a detection unit configured to detect that the second device is in a first operating state; and a control unit configured to cancel a stop state of current consumption of the current consumption unit based on the detection that the second device is in the first operating state.

2. The cable according to claim 1, wherein the detection unit is further configured to detect that the second device is in the first operating state when a specific voltage is applied to a data line on a side of the second device.

3. The cable according to claim 1, wherein the detection unit is further configured to send detection information, that indicates the detection of the second device in the first operating state, to the control unit through a specific line.

4. The cable according to claim 1, wherein the control unit is further configured to control the current consumption unit to operate in a second operating state based on the detection that the second device is in the first operating state.

5. The cable according to claim 1, further comprising
a power source unit configured to supply the current to the current consumption unit wherein
the control unit is further configured to control the power source unit to operate in a second operating state based on the detection that the second device is in the first operating state.

6. The cable according to claim 1, wherein
the first device is a High Definition Multimedia Interface (HDMI) transmitter, and
the second device is an HDMI receiver.

7. A connection device that connects a first device and a second device, the connection device comprising:
a power line configured to supply a current from the first device to the second device;
a current consumption unit configured to:
receive supply of the current from the first device through the power line, and
adjust a signal quality interposed in a data line;
a detection unit configured to detect that the second device is in an operating state; and
a control unit configured to cancel a stop state of current consumption of the current consumption unit based on the detection that the second device is in the operating state.

* * * * *